United States Patent [19]

Kepler

[11] 4,090,809
[45] May 23, 1978

[54] COMBINATION ADJUSTABLE THRUST RING AND SHAFT PACKING RING FOR HYDRAULIC TURBINE WICKET GATES

[75] Inventor: James L. Kepler, York, Pa.

[73] Assignee: Allis-Chalmers Corporation, Milwaukee, Wis.

[21] Appl. No.: 744,086

[22] Filed: Nov. 22, 1976

[51] Int. Cl.² .......................... F01B 25/10; F03B 3/18
[52] U.S. Cl. ..................................... 415/163; 415/185; 415/208
[58] Field of Search ............... 415/163, 160, 155, 185, 415/210, 208, 184, 191; 251/214; 277/105

[56] References Cited

U.S. PATENT DOCUMENTS

| 1,817,654 | 8/1931 | Terry | 415/163 UX |
| 2,421,841 | 6/1947 | Lowy | 415/163 UX |
| 2,930,579 | 3/1960 | Boyd et al. | 415/160 |
| 3,791,761 | 2/1974 | Hayes | 415/163 |

FOREIGN PATENT DOCUMENTS

| 578,034 | 6/1946 | United Kingdom | 415/163 |

Primary Examiner—John J. Vrablik
Assistant Examiner—Donald S. Holland
Attorney, Agent, or Firm—John P. Hines

[57] ABSTRACT

A plurality of threaded studs are rigidly connected to the turbine head cover about each wicket gate shaft. A packing ring is adjustably connected to the threaded studs to hold the wicket gate shaft packing between the head cover and the wicket gate shaft. A thrust ring is also adjustably attached to the threaded studs to provide thrust clearance adjustment between the thrust ring and the wicket gate.

2 Claims, 4 Drawing Figures

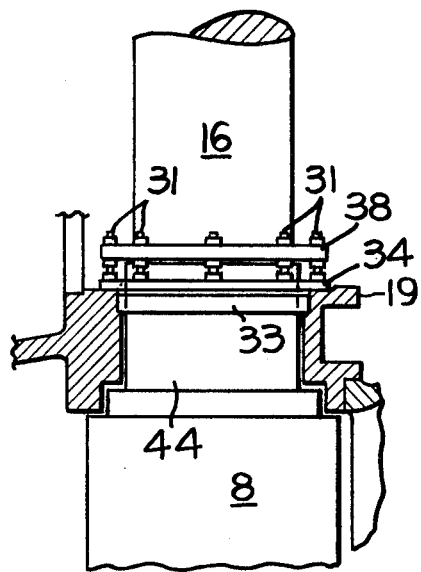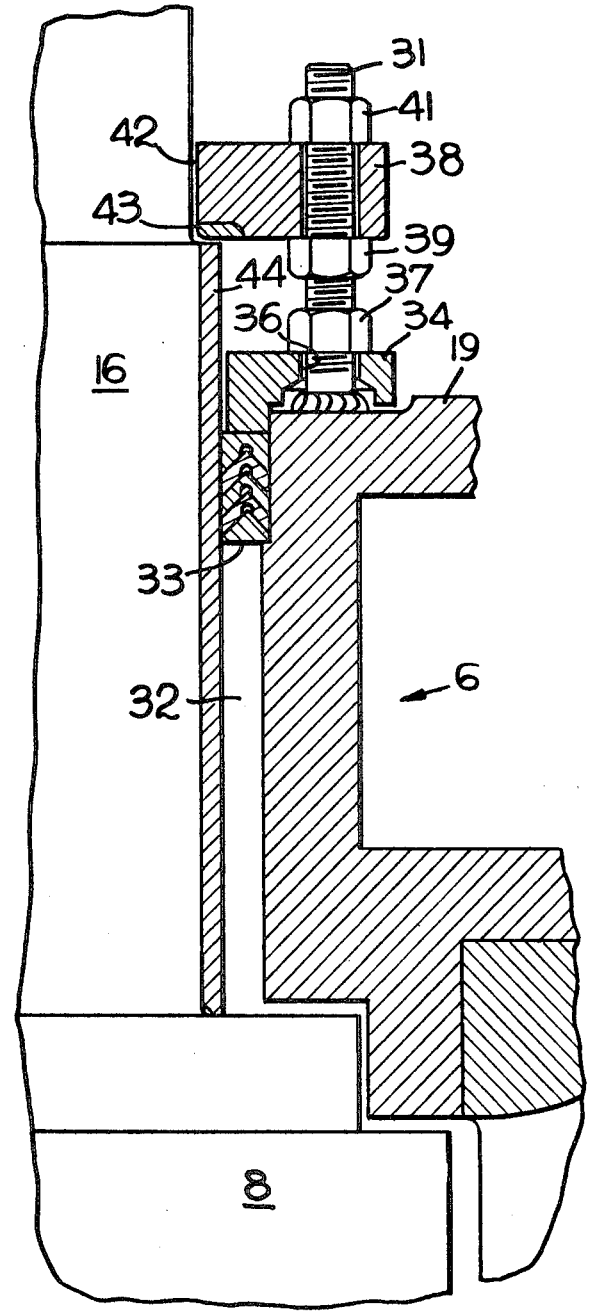

COMBINATION ADJUSTABLE THRUST RING AND SHAFT PACKING RING FOR HYDRAULIC TURBINE WICKET GATES

This invention pertains in general to hydraulic turbine wicket gates and more particularly to a single mechanism for both adjusting the thrust clearance of the wicket gates and positioning the wicket gate shaft packing.

In many types of hydraulic turbines wicket gates are provided about the turbine runner to control the water passing through the runner. Because of the large volumes of water which are controlled by the wicket gates, considerable axial thrust is imposed on the gates. In the past, a machined surface on the wicket gate mated with a machined surface on the head cover to provide the proper thrust clearance. If later adjustment was necessary, the wicket gates were partially disassembled and either further machined or shims were required to adjust the thrust clearance.

As the state of the art of wicket gate thrust adjusting mechanisms progressed, an adjustable mechanism was developed. Examples of such mechanisms for adjusting the thrust clearance on wicket gate assemblies are shown in U.S. Pat. No. 2,291,110 issued to R. E. B. Sharp July 28, 1942, and U.S. Pat. No. 3,791,761 issued to Gerald L. Hayes Feb. 12, 1974 and assigned to the same assignee as this invention.

The subject invention further advances this art by providing a more versatile arrangement which not only permits adjustment of the wicket gate thrust clearance, but also includes provision to adjust the wicket gate shaft packing.

It is therefore the intention and general object of this invention to provide a mechanism which offers adjustment for both the wicket gate shaft packing and the wicket gate hydraulic thrust clearance for a hydraulic turbine.

A more specific object of the subject invention is to provide a mechanism of the hereinbefore described type which includes a plurality of threaded studs welded to the turbine head cover about the wicket gate shaft trunnion and to which are adjustably attached a shaft packing ring and a hydraulic thrust ring.

BRIEF DESCRIPTION OF THE DRAWINGS

These and other objects of the subject invention will become more fully apparent as the following description is read in light of the attached drawing in which:

FIG. 3 is a slightly enlarged view of a complete adjusting mechanism for one wicket gate; and FIG. 4 is an enlarged view of a portion of the wicket gate adjusting mechanism.

DESCRIPTION OF THE PREFERRED EMBODIMENT

Figure 1:
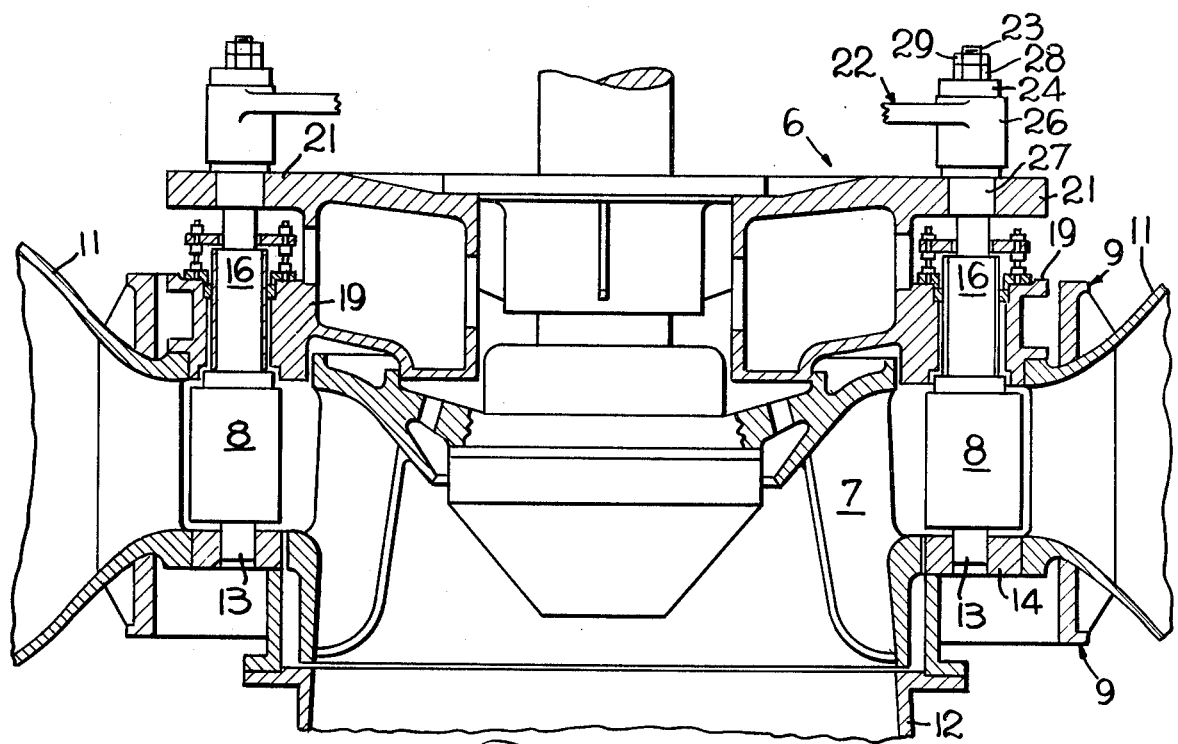
FIG. 1 is a sectional view of a portion of a hydraulic turbine showing the environment of the adjusting mechanism for the wicket gate thrust ring and packing ring.
Figure 2:
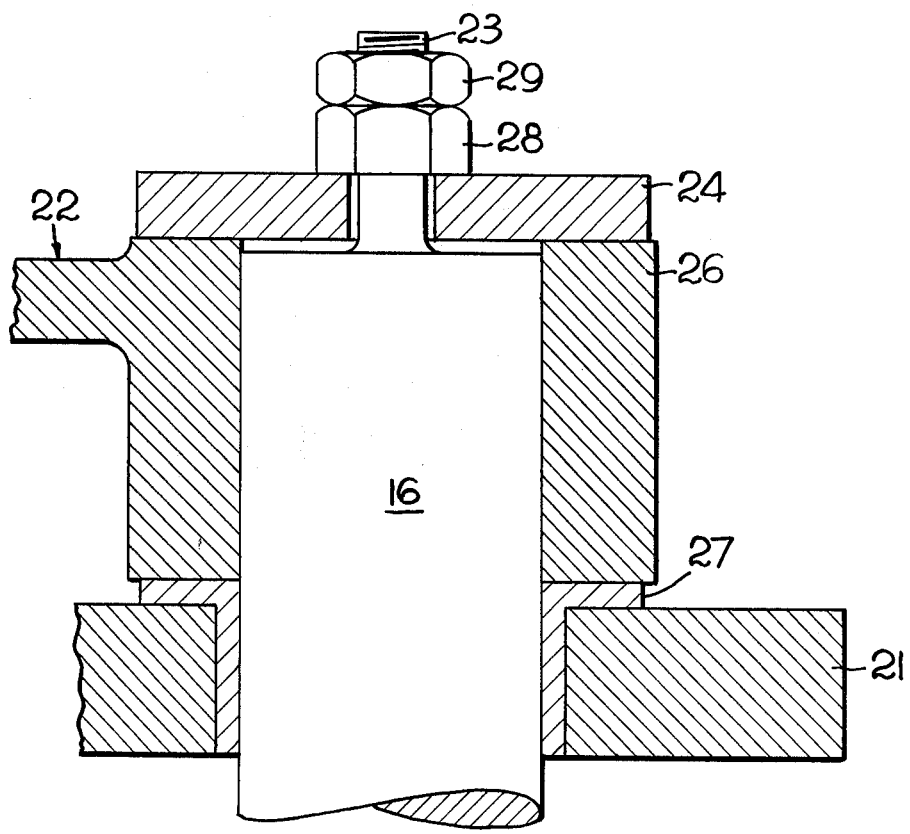
FIG. 2 is an enlarged view of the upper end of the wicket gate shaft.

Referring to FIG. 1, there is disclosed a portion of a hydraulic turbine, in this instance a Francis turbine, in which environment the adjusting mechanism of this invention is described. Broadly the turbine comprises: A head cover 6 that is stationary and spans the top of the turbine runner 7 and wicket gates 8; a stay ring 9 which is a structural member joining the spiral case 11 with the top and bottom parts of the turbine. The spiral casing 11 (only a portion of which is shown) provides the passageway for the water as it flows to the runner 7. The wicket gates 8 surround the runner and control the flow of water from the spiral case 11 to the runner 7. After passing through the runner 7, the water exits through a draft tube 12.

As herein shown for purposes of illustration, a stub shaft 13 is provided at the lower end of each wicket gate 8. The stub shaft 13 may be journalled in a bottom ring 14.

An elongated shaft 16 is connected to the upper end of each wicket gate 8. The shaft 16 extends through both decks 19 and 21 of the head cover 6 and terminates above the head cover. A control or gate arm generally designated 22 is connected to the portion of the wicket gate shaft 16 extending above the head cover 6. As herein shown for purposes of illustration, the shaft 16 extends through a bore provided through the end of the control arm 22. Means such as a keyway and a key (not shown) are provided to insure coextensive movement of the shaft 16 with the control arm 22.

Vertical adjustment and support of the wicket gate may be provided in any conventional manner. To this end, a threaded stud 23 is provided on the upper end of the elongated shaft 16. This threaded stud extends through a bore provided in a cap 24. The cap 24 rests on a boss portion 26 of the control arm 22 which encircles the elongated shaft 16. The lower portion of the boss 26 engages a sleeve bearing 27 provided in an opening in the upper deck 21 of the head cover through which the elongated shaft 16 extends. An adjusting nut 28 and a lock nut 29 are provided on the threaded stud 23. The position of the wicket gate 8 can be adjusted by turning the adjusting nut 28 until the wicket gate blades are properly positioned in the water passageway. The lock nut 29 is then turned into place securely holding the wicket gate adjusting nut. In this position, the wicket gate is supported by the head cover 6 through the cap 24, the boss 26 and the bushing 27.

A plurality of circumferentially spaced threaded studs or support means 31 are rigidly connected to the lower deck 19 about the elongated shaft 16 and extend substantially parallel thereto. The studs may be connected to the lower deck 19 in any convenient manner and as shown herein for purposes of illustration are welded to the head cover. Since the space 32 between the elongated shaft 16 and the head cover 6 is opened to the water in the turbine water passageway, shaft packing 33 must be provided to effect a water seal about the elongated shaft 16. A packing ring 34 having a plurality of circumferentially spaced bores 36 therethrough equal in number to and having identical spacing to the studs 31 is guided on the studs 31. A nut 37 threaded on the stud 31 engages the packing ring 34 to force the ring into engagement with the shaft packing 33. The necessary compression of the shaft packing to provide an adequate seal about the shaft can be effected by tightening the nut 37 against the packing ring 34.

A thrust ring 38 is provided with a plurality of circumferentially spaced bores therethrough which correspond to the spacing of the studs 31. The thrust ring 38 is supported on the studs 31 between spaced nuts 39 and 41. The elongated shaft 16 extends through a bore 42 of the thrust ring. The thrust ring 38 has a portion thereof adjacent to the elongated shaft 16 relieved and a bronze overlay 43 is provided therein. The upper end of a bronze sleeve 44 on the elongated shaft 16 forms a thrust surface co-acting with the bronze overlay 43 to provide an adjustable thrust bearing for the wicket gates. By adjusting the nuts 39 and 41 the thrust clearance between the ring 38 and the sleeve 44 can be varied.

From the above description, it can be seen that a less expensive shaft packing and thrust bearing arrangement has been provided. This arrangement provides a more versatile mechanism to permit easy adjustment of both the thrust clearance and the shaft packing pressure for a hydraulic turbine wicket gate assembly.

The embodiments of the invention in which an exclusive property or privilege is claimed are defined as follows:

1. In a hydraulic turbine having a runner covered by the turbine head cover, the improvement comprising:
  a plurality of wicket gates positioned about said runner and each gate including an elongated shaft extending through said head cover;
  means engaging said head cover and connected to said elongated shaft to resist axial movement of said gate in one direction;
  a thrust surface formed on said elongated shaft;
  shaft packing located between said shaft and said head cover;
  a thrust ring positioned adjacent said thrust surface;
  a packing ring positioned adjacent said packing; and
  a plurality of circumferentially spaced support means connected to said head cover about said shaft, both said thrust ring and said packing ring independently and adjustably connected to said support means adjacent to said thrust surface and said shaft packing respectively and for selective independent adjustment of each ring to obtain the desired clearance between said thrust ring and said surface to resist movement of said gate in the opposite direction and to resist movement of said shaft packing.

2. In a hydraulic turbine having a runner covered by the turbine head cover, the improvement comprising: a plurality of wicket gates positioned about said runner and each gate including an elongated shaft extending through said head cover; means engaging said head cover and connected to said elongated shaft to resist axial movement of said gate in one direction; a thrust surface formed on said elongated shaft; shaft packing located between said shaft and said head cover; a plurality of circumferentially spaced threaded studs rigidly connected to said head cover about said shaft and extending substantially parallel thereto; a packing ring having a plurality of bores therethrough positioned on said studs and engaging said packing; a nut threaded onto each of said studs and engaging said packing ring to vary the pressure exerted by said packing ring on said packing; a thrust ring having a plurality of bores therethrough positioned on said studs adjacent to said elongated shaft thrust surface; and first and second nuts threaded onto said studs on opposite sides of said thrust ring, said nuts being movable on said studs to provide an adjustable clearance between said thrust ring and said thrust surface to resist movement of said elongated shaft in the opposite direction.

* * * * *